(12) United States Patent
Phipps et al.

(10) Patent No.: US 7,504,951 B2
(45) Date of Patent: Mar. 17, 2009

(54) INTERFACE ANTENNA

(75) Inventors: Will Phipps, Fairport, NY (US); Alberto Rodriguez, Webster, NY (US); Scott J. Bell, Rochester, NY (US); Heiko Rommelmann, Penfield, NY (US); Steven C. Hart, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 454 days.

(21) Appl. No.: 11/316,479

(22) Filed: Dec. 22, 2005

(65) Prior Publication Data

US 2007/0146138 A1 Jun. 28, 2007

(51) Int. Cl.
*G08B 13/14* (2006.01)

(52) U.S. Cl. ............... 340/572.7; 340/572.8; 343/742; 343/866; 399/12; 399/25

(58) Field of Classification Search ............ 340/572.1, 340/572.7, 572.8; 399/12, 25, 110, 111; 343/742, 866

See application file for complete search history.

(56) References Cited

U.S. PATENT DOCUMENTS

| | | | |
|---|---|---|---|
| 6,016,409 A | 1/2000 | Beard et al. | 399/33 |
| 6,259,369 B1 * | 7/2001 | Monico | 340/572.8 |
| 6,351,621 B1 | 2/2002 | Richards et al. | 399/111 |
| 6,377,764 B1 | 4/2002 | Morris-jones | 399/75 |
| 6,839,035 B1 * | 1/2005 | Addonisio et al. | 340/572.1 |
| 2007/0080804 A1 * | 4/2007 | Hirahara et al. | 340/572.1 |

* cited by examiner

*Primary Examiner*—Thomas J Mullen
(74) *Attorney, Agent, or Firm*—Wiggin and Dana LLP

(57) ABSTRACT

An interface antenna is positioned between a tag antenna associated with a tag and a reader antenna associated with a reader. The interface antenna receives an electromagnetic carrier signal transmitted by the reader antenna and causes an increase in intensity of the electromagnetic carrier signal at the location of the tag antenna, thereby increasing the distance over which the tag can communicate with the reader. Where the tag is attached to a packaged object, the interface antenna may be included in the package to allow wireless data communication between the tag and a reader external to the package. For example, the interface antenna may be attached to a label on the package. At least a portion of the interface antenna may be formed from a conductive ink applied to the label and/or the container. The object may be a module, also known as a customer replaceable unit (CRU), and the tag may be configured as a customer replaceable unit monitor (CRUM).

31 Claims, 6 Drawing Sheets

INTERFACE ANTENNA

BACKGROUND

A common trend in machine design, particularly in the office equipment industry, is to organize a machine on a modular basis, wherein certain distinct subsystems of the machine are bundled together into modules which can be readily removed from the machine and replaced with new modules of the same or similar type. A modular design facilitates great flexibility in the business relationship with the customer. By providing subsystems in discrete modules, also known as "customer replaceable units" or CRUs, visits from a service representative can be made very short, since all the representative has to do is remove and replace a defective module. Actual repair of the module may take place remotely at the service provider's premises. Further, some customers may wish to have the ability to buy modules "off the shelf," such as from an equipment supply store. Indeed, it is possible that a customer may lease the machine and wish to buy a supply of modules as needed. Further, the use of modules, particularly for expendable supply units (e.g., copier and printer toner bottles) are conducive to recycling activities.

In order to facilitate a variety of business arrangements among manufacturers, service providers, and customers, it is known to provide these modules with electronically-readable memory devices, also known as "customer replaceable unit monitors" or CRUMs, which, when the module is installed in the machine, enable the machine to both read information from the CRUM and also write information to the CRUM. The information read from, or written to, the CRUM may be used by the machine to perform various functions. For example, U.S. Pat. No. 6,016,409 entitled "System For Managing User Modules in a Digital Printing Apparatus", which is incorporated by reference herein in its entirety, describes various data that may be stored in a CRUM and various functions that may be performed using this data.

The use of CRUMs in a machine requires that the machine include a means for communicating data between the CRUMs and the control circuitry resident in the machine. This may be accomplished wirelessly. For example, U.S. Pat. No. 6,377,764 issued Apr. 23, 2003 and entitled "Method and Apparatus for Communication, Without A Solid Medium, Among Control Boards in a Printing Apparatus," which is incorporated by reference herein in its entirety, describes a digital printing apparatus in which one or more modules has a board therein, which is able to communicate with another board within the apparatus by infrared or other wireless communication. In another example, U.S. Pat. No. 6,351,621 to Richards et al., describes a printer or copier having a removable module, such as a marking material supply module or a marking device module, that is provided with a CRUM. The non-volatile memory of the CRUM is accessed through a wireless interface, such as a radio frequency identification (RFID) system, which is also associated with the module. The memory can be accessed, through wireless means, either by the printer or copier itself or by an external device.

Wireless identification systems (e.g., RFID systems) typically include two sub-assemblies: a tag (also known as a transponder) and a reader (also known as an interrogator, transceiver, or coupler). The tag is typically attached to an object, and includes, among other components, an antenna and an integrated circuit (IC) device. Stored within the IC device is information related to the object to which the tag is attached. While this information usually includes identification data for the object, it may include other information related to, or used by, the object (e.g., tracking information, usage information, computer code, etc.). For example, the object may be a CRU and the tag may be a CRUM.

In operation, the antenna on the tag receives incoming data signals superimposed on a modulated carrier signal, which is provided by an antenna on the reader. In response to the incoming data signals, the tag superimposes data from the IC device onto the carrier signal by changing its own circuit impedance. In some tags, known as passive tags, the carrier signal is used to provide operating power for the tag. In other tags, known as active tags, at least some of the operating power for the tag is provided by a source other than the carrier signal (e.g., a battery).

The reader forms the interface between the tag and a host computer. The reader generally includes an integrated circuit chip and associated circuitry that allows it to communicate with both the tag and the host computer. Typically, there is a predefined command set used by the host computer to control the reader, which passes the commands to the tag via the modulated carrier signal. The reader generates the modulated carrier signal to transmit data to the tag, and receives data from the tag by detecting the loading effects of the tag on the carrier signal.

Any given tag and reader combination will communicate data over a limited distance. For example, an RFID system that conforms to International Standards Organization (ISO) Standard 14443-2B (13.56 mega-Hertz (MHz)) is ideal for communicating over distances of between 0 millimeters (mm) to 30 mm. If a system is designed to operate in the 10 mm to 20 mm range, it is unlikely this system will work in the 40 mm to 50 mm range. Problematically, it is unlikely that the designed communication range can be maintained at every desired point of access (e.g., during production, packaging, shipping, and installation). For example, when a CRU having an attached CRUM is packaged for shipping or storage, the distance between the CRUM within the package and a reader external to the package may be greater than the designed operating range. As a result, the CRUM must be removed from the package to place the reader close enough for data communication between the CRUM and reader.

The distance over which the tag and the reader can communicate can be increased by increasing the size of the antenna on the tag; however, smaller tags are more desirable because of cost and space considerations.

BRIEF SUMMARY

According to one aspect, there is provided an interface antenna for increasing a distance over which a tag can communicate with a reader. When the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader.

In another aspect, there is provided a package for an object where the object has a tag associated therewith for wirelessly communicating data with a reader external to the package. The package includes an interface antenna for increasing a distance over which the tag can communicate with the reader. When the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader.

In yet another aspect, there is provided a packaging label having an interface antenna attached thereto for increasing a distance over which a tag can communicate with a reader. When the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader.

In yet another aspect, there is provided a method for increasing a distance over which a tag can communicate with a reader. The method comprises: positioning an interface antenna between a tag antenna associated with the tag and a reader antenna associated with the reader, wherein the interface antenna receives an electromagnetic carrier signal transmitted by the reader antenna and causes an increase in intensity of the electromagnetic carrier signal at the location of the tag antenna, thereby increasing the distance over which the tag can communicate with the reader.

In yet another aspect, there is provided a module installable in a machine. The module has a tag and an interface antenna associated therewith. The tag includes a tag antenna coupled to an integrated circuit device having data related to the module stored therein. The tag is configured to superimpose the data from the integrated circuit device onto an electromagnetic carrier signal received by the tag antenna. The interface antenna is configured to increase an intensity of the electromagnetic carrier signal at the location of the tag antenna.

BRIEF DESCRIPTION OF THE DRAWING

Referring now to the figures, which are exemplary embodiments, wherein like items are numbered alike.

DETAILED DESCRIPTION

Figure 1:
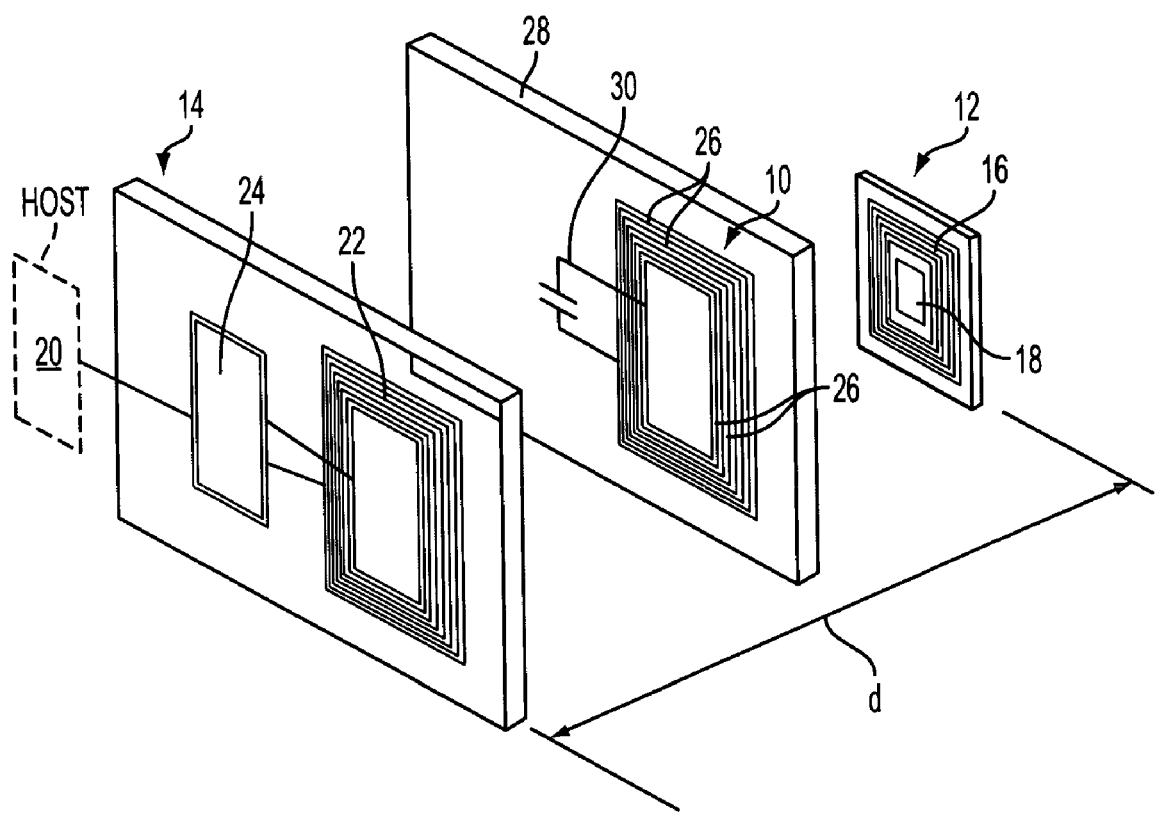
FIG. 1 depicts an interface antenna disposed between a tag and a reader.

FIG. 1 depicts an interface antenna 10 for increasing a distance over which a tag (also known as a transponder) 12 can communicate with a reader (also known as an interrogator, transceiver, or coupler) 14. The tag 12 is typically attached to an object (not shown), and includes a tag antenna 16 and an integrated circuit (IC) device 18. Stored within the IC device 18 is information related to the object to which the tag 12 is attached. While this information usually includes identification data for the object, it may include other information related to, or used by, the object, as will be described in further detail hereinafter. It is contemplated that the object to which the tag 12 is attached may be any tangible item. In one embodiment, described hereinafter with respect to FIG. 8, the object includes a replaceable module for a machine, also referred to as a CRU (Customer Replaceable Unit), and the tag 12 is configured as a CRUM (Customer Replaceable Unit Monitor).

The reader 14 forms the interface between the tag 12 and a host processor (e.g., a computer) 20. The reader 14 generally includes a reader antenna 22, an integrated circuit device 24, and other associated circuitry that allows the reader 14 to communicate with both the tag 12 and the host processor 20. Typically, there is a predefined command set used by the host processor 20 to control the reader 14, which passes the commands to the tag 12 via a modulated, electromagnetic carrier signal transmitted from the reader antenna 22. The reader 14 generates the modulated carrier signal to transmit data to the tag 12, and receives data from the tag 12 by detecting loading effects of the tag 12 on the carrier signal.

As used herein, a reader is any device that generates a modulated, electromagnetic carrier signal to be received by a tag, and receives data from the tag by detecting loading effects on the carrier signal. Similarly, a tag is any device that receives a modulated, electromagnetic carrier signal transmitted by a reader and superimposes data onto the carrier signal by load variation.

The interface antenna 10 is positioned between the tag antenna 16 and the reader antenna 22 such that the interface antenna 10 receives the modulated carrier signal transmitted by the reader antenna 22. The interface antenna 10 causes an increase in intensity of the modulated carrier signal at the location of the tag antenna 12, thereby allowing wireless data communication between the tag 12 and the reader 14 at distances "d" greater than that which would be possible without the interface antenna 10.

The interface antenna 10 may be formed from one or more loops (turns) 26 of conductive material disposed on a substrate 28, and may include a charge storage element (e.g., a capacitor) 30 electrically connected across the loops 26. The loops 26 and the charge storage element 30 are adhered to, imbedded in, or otherwise attached to the substrate 28. It is also contemplated that the interface antenna 10 may be formed from one or more loops 26 without the charge storage element 30.

The substrate 28 may be formed from any convenient material. For example the substrate 28 may be formed from a printed circuit board, plastic, paper, cardboard, nylon, and the like. As will be described in further detail hereinafter, the substrate 28 may form part of a package to allow data communication between a tagged item disposed in the package and a reader external to the package.

The loops 26 of conductive material may be formed using any convenient means. For example, the loops 26 may be formed from one or more wires or from a stamped or etched conductive material (e.g., a metal or metal alloy) attached to the substrate 28. It is also contemplated that the loops 26 may be formed from an electrically conductive ink applied to the substrate 28. The ink may be applied using any conventional method, such as spraying, screening, painting, and the like.

For example, the electrically conductive ink may include any of a number of thermosetting or thermoplastic highly conductive silver inks manufactured by Dow Corning Corporation of Midland, Mich. Advantageously, the use of a conductive ink to form the loops 26 allows the interface antenna 10 to be applied to any number of different surfaces. It is also believed that the use of a conductive ink to form the loops 26 will reduce the cost of the interface antenna 10 to below that possible where the loops 26 are formed from a wire or etched conductive trace.

The charge storage element 30 may be formed from a surface-mounted device (e.g., an SMT capacitor) attached to the substrate 28. Alternatively, the charge storage element 30 may also be formed along with the loops 26 as part of a stamping or etching process (e.g., formed from a metallic trace). It is also contemplated that the charge storage element 30 may be formed on the substrate 28 along with the loops 26 by the application of the conductive ink.

As shown in FIG. 1, the loops 26 of the interface antenna 10 extend in a plane defined by the substrate 28. The tag antenna 16 and reader antenna 22 may be similarly formed as generally planar loop antennas. In the embodiment shown, the interface antenna 10 is positioned between the tag antenna 16 and the reader antenna 22 such that the off-plane orthogonal axis of the interface antenna 10 is generally aligned with those of the tag antenna 16 and reader antenna 22.

The interface antenna 10 may be tuned based on such criteria as the expected distance "d" between the tag antenna 18 and the reader antenna 22, and the designs of the tag antenna 16 and reader antenna 22. For example, where the interface antenna 10 does not include the charge storage element 30, the interface antenna 10 may be tuned by changing the number of the loops 26, and/or by changing the cross-sectional area of the conductive material forming the loops 26. Where the charge storage element 30 is used, the interface antenna 10 may be further tuned by changing the capacitance associated with charge storage element 30.

Figure 2:
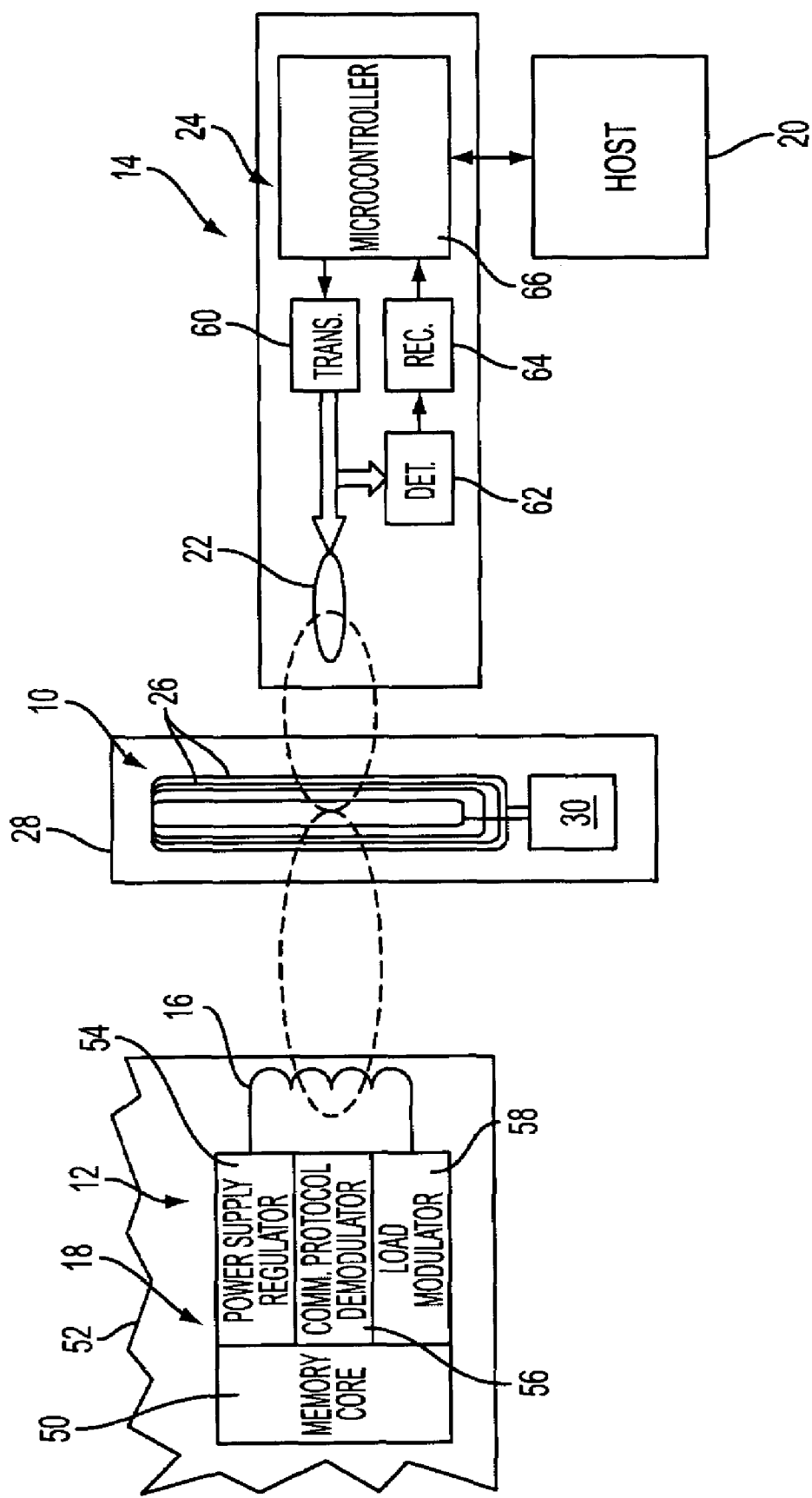
FIG. 2 is a schematic depiction of the tag, the reader, and the interface antenna.

Referring to FIG. 2, a schematic depiction of the tag 12, the reader 14, and the interface antenna 10 are shown. In the embodiment of FIG. 2, the tag 12 is depicted as a passive radio-frequency identification (RFID) tag, which communicates data by way of electromagnetic field coupling between the tag antenna 16 and the reader antenna 22. Within the tag 12, data storage and processing as well as radio frequency (RF) communications functions are typically performed by one or more integrated circuit chips 18. For example, the tag 12 may include: a memory core (e.g., an EEPROM) 50, which stores data associated with an object 52 (e.g., a module or CRU) to which the tag 12 is attached; a power supply regulator 54, which rectifies and otherwise conditions alternating current induced in the tag antenna 16 by the time-varying RF carrier signal provided by the reader antenna 22 for use in the tag as a direct current power source; and receiver/emitter modules 56 and 58 (e.g., compatible with the ISO 14443 standard) for demodulating and decoding incoming data from the received RF signal and superimposing outgoing data on the RF signal by load variation, respectively.

While FIG. 2 depicts a passive RFID tag, it is also contemplated that the tag 12 may include an active or partially active RFID tag, which uses a battery (e.g., a thin power source) to provide all or part of the operating power for the tag 12.

The reader 14 includes a transmitter 60 that generates the time-varying RF signal transmitted by the reader antenna 22. As a result of electromagnetic coupling between the tag antenna 16 and the reader antenna 22, a portion of the RF signal transmitted by the tag antenna 16 enters the reader antenna 22 and is separated from the transmitted signal by a detector (e.g., an envelope detector) 62. The separated signal is passed to a receiver 64, where it is amplified, decoded and presented via a microcontroller 66 to the host processor 20.

With the interface antenna 10 positioned at least partly between the tag antenna 16 and the reader antenna 22, the electromagnetic RF carrier signal transmitted by the reader antenna 22 is re-focused by the interface antenna 10. More specifically, the electrical and physical properties of the interface antenna 10, notably, the number of loops 26, the cross-section of the wire from which the loops are made and the spacing between the loops, are are chosen along with the value of the charge storage element 30, if used, such that the total reactance (including the stray capacitance in the antenna loops 26) allow the interface antenna 10 to resonate at approximately the same resonant frequency as the tag antenna 16. It is believed that this resonance allows the interface antenna 10 to increase the electromagnetic flux intensity or field strength of the RF signal transmitted by the reader reader antenna 22 at asignificantly increased distance from the reader antenna 22. It has been determined that this increase in electromagnetic energy allows the tag 12 to be powered by the carrier signal transmitted by the reader antenna 22 at distances greater than that which would be possible without the interface antenna 10, thus allowing wireless data communication between the tag 12 and the reader 14 at these greater distances. Indeed, it has been determined by the present inventors that the interface antenna 10 can more than double the range over which the tag 12 and reader 14 can communicate.

Figure 3:
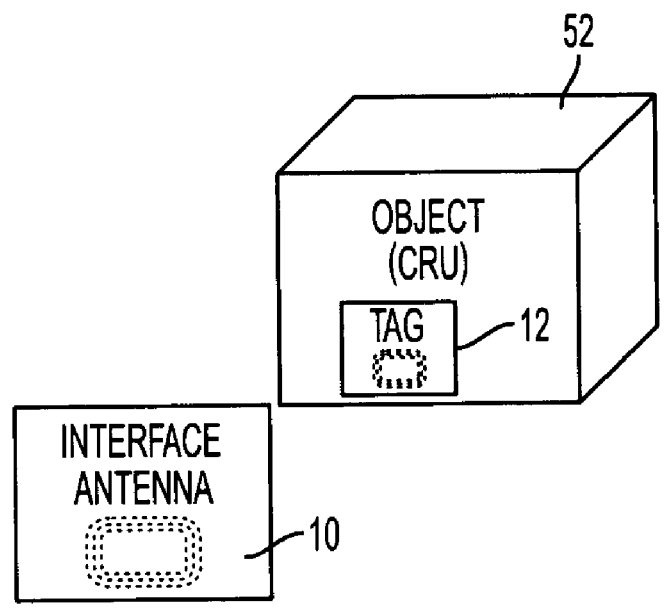
FIG. 3 depicts an interface antenna associated with an object, such as a CRU, wherein the interface antenna is positioned adjacent to, but not attached to, the object.
Figure 4:
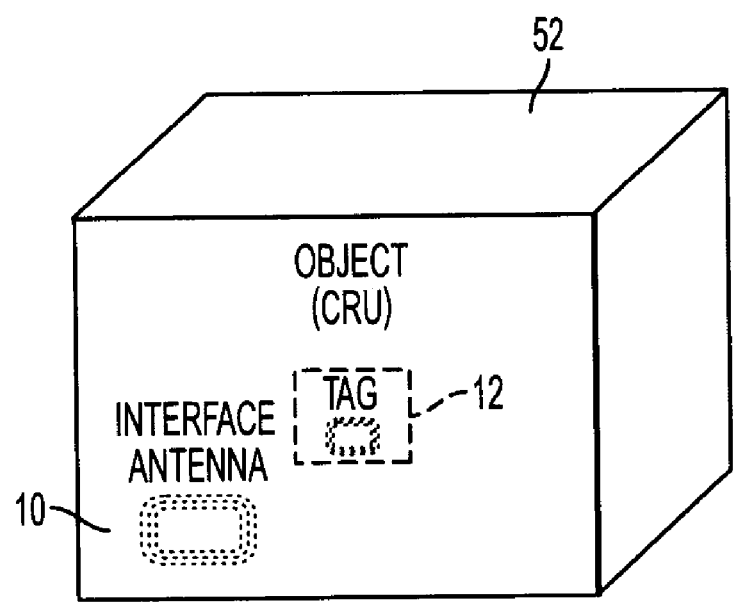
FIG. 4 depicts an interface antenna associated with an object, such as a CRU, wherein the interface antenna is attached to the object.

In FIGS. 3 and 4, the interface antenna 10 is shown as being associated with the object 52, which may be a CRU. In FIG. 3, the interface antenna 10 is positioned proximate the object 52, but is not attached to the object 52. The interface antenna 10 may be held in position relative to the object 52 using any convenient means. In FIG. 4, the interface antenna 10 is attached to the object 52. For example, the interface antenna 10 may form part of a label attached to the object 52 or may be secured to the object 52 as part of a housing for the object 52. The embodiment of FIG. 4 is particularly useful where the tag 12 is disposed within the object 52.

As shown in FIGS. 5-9, the interface antenna 10 may be used to allow data communication between a tag 12 secured to an object 52 disposed in a package 70 and a reader 14 external to the package 70. In each of these embodiments, the interface antenna 10 is positioned between the tag 12 and the reader 14 to increase the data communication range of the tag 12 and the reader 14. As a result, data communication between the tag 12 and reader 14 can take place through the package 70, without having to remove the object 52 from the package 70.

Figure 5:
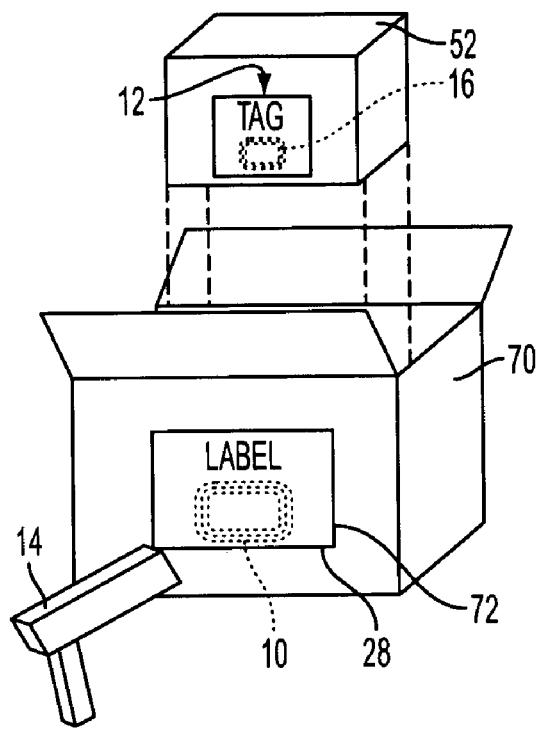
FIG. 5 depicts an embodiment in which the interface antenna is part of a label secured to a package.

FIG. 5 depicts an embodiment in which the interface antenna 10 is part of a label 72 that may be secured to the package 70. For example, the label 72 may include an adhesive sheet that forms the substrate 28 for the interface antenna 10. As used herein, a label includes any identifying or descriptive marker that may be attached to an object. For example, the label 72 may include a packaging label, which includes text or other visual information relating to the package 70.

Figure 6:
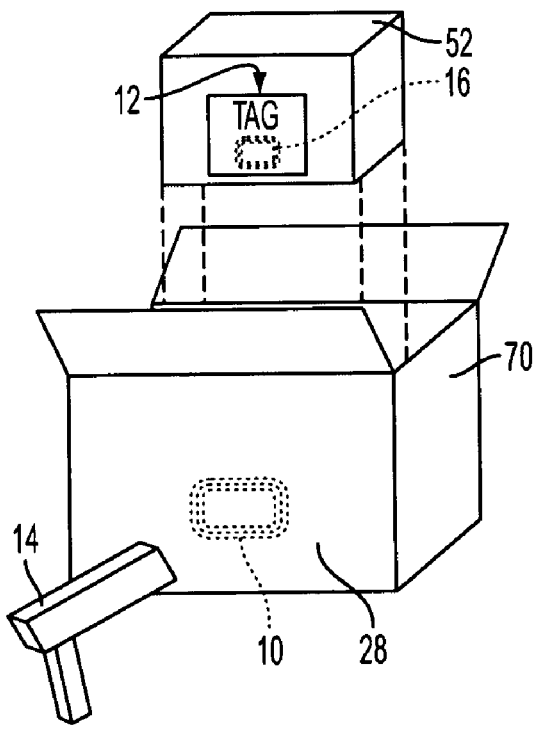
FIG. 6 depicts an embodiment in which a portion of the package forms a substrate for the interface antenna.

FIG. 6 depicts an embodiment in which the substrate 28 of the interface antenna 10 is a portion of the package 70. For example, the electrically conductive material forming the interface antenna 10 may be printed, adhered, or otherwise attached to the package 70. Alternatively, the material forming the interface antenna 10 may be imbedded in or printed on the material forming the package 70.

Figure 7:
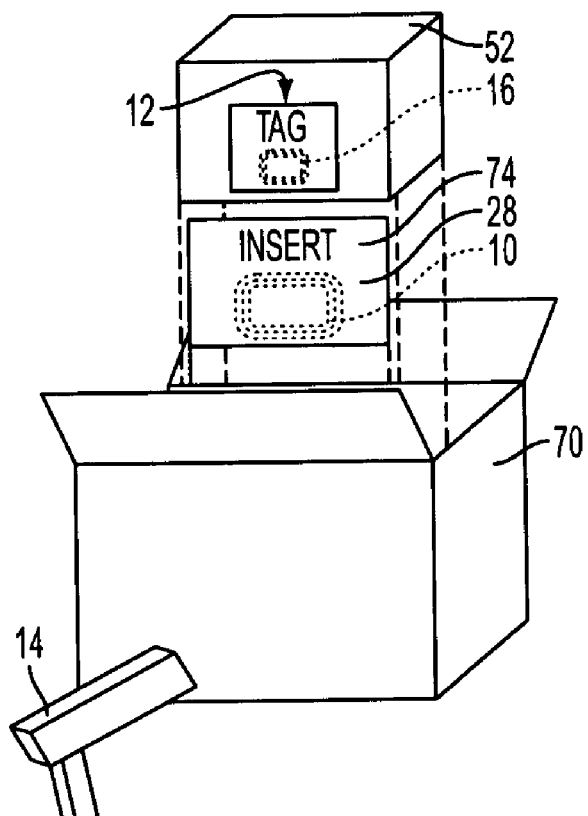
FIG. 7 depicts an embodiment in which the interface antenna is attached to a package insert.

FIG. 7 depicts an embodiment in which the interface antenna 10 is part of an object 74 that is inserted in the package 70 along with the tagged object 52. For example, the interface antenna 10 may be part of a card, packing material, wrapping, etc that is inserted in the package 70.

Figure 8:
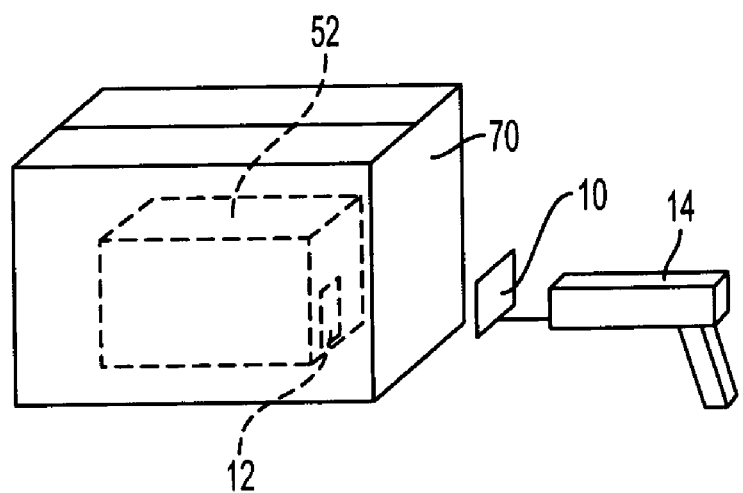
FIG. 8. depicts an embodiment in which the interface antenna is attached to the reader.

FIG. 8 depicts an embodiment in which the interface antenna 10 is attached to the reader 14. This embodiment is particularly useful for adapting the reader 14 to communicate with the tag 12 through the package 70.

Figure 9:
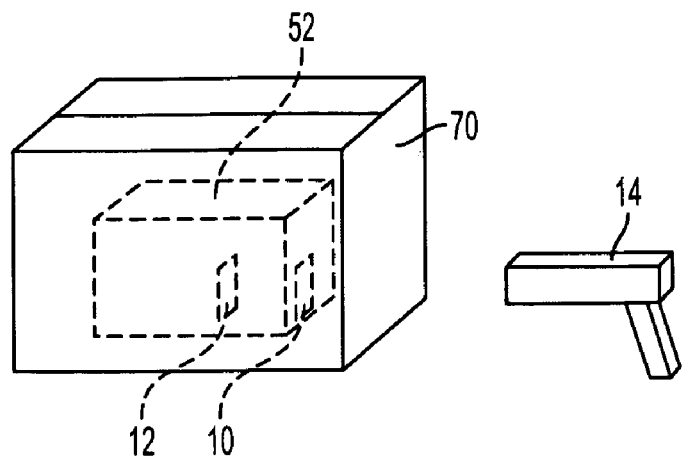
FIG. 9 depicts an embodiment wherein the tag and the interface antenna are disposed on the same object.

FIG. 9 depicts an embodiment wherein the tag 12 and the interface antenna 10 are disposed on the same object 52. For example, the interface antenna 10 may form part of a label that is attached to an outer surface of the object 52, while the tag 12 is disposed on a module, subassembly, or component inside the object 52. The interface antenna 10 allows data communication between the tag 12 within the object 52 and the reader 14 external to the package 70.

As used herein, a package includes any container in which something is packed for storage or transportation. While FIGS. 5-9 depict the package 70 as a box, it is contemplated that the package 70 may include anyone or more of: an envelope, a wrapper, a pallet, a carton, a can, a jar, a tray, a trunk, a sleeve, a cargo container, and the like.

Figure 10:
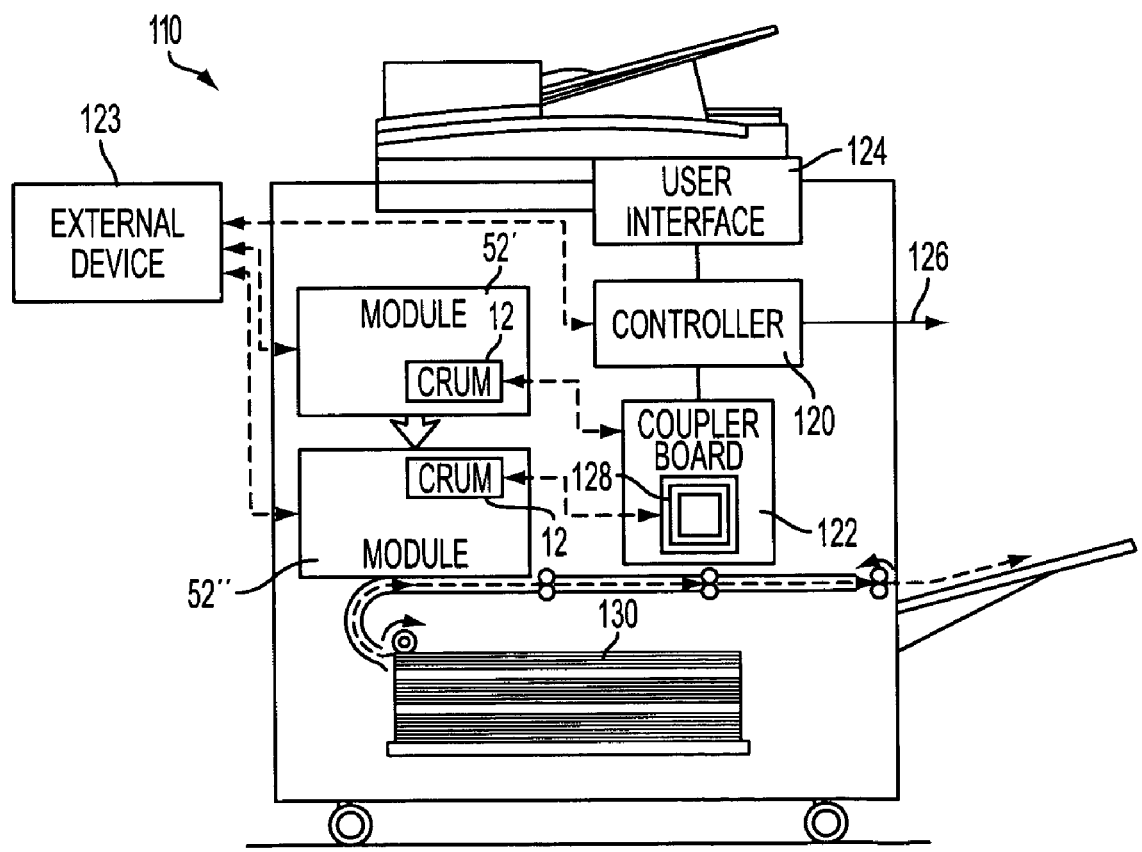
FIG. 10 is a schematic depiction of a machine including customer replaceable modules, each of which has a tag disposed thereon in the form of a customer replaceable unit monitor.

As used herein, an object includes any tangible item to which a tag 12 may be attached. As previously noted, the object 52 may include a replaceable module for a machine. For example, FIG. 10 is a schematic depiction of a machine 110 including replaceable modules 52' and 52", also known as "Customer Replaceable Units" or CRUs. Attached to each of the modules 52' and 52" is a tag 12, which is configured as a CRUM (Customer Replaceable Unit Monitor). The memory core in each CRUM (tag) 12 retains data relevant to the identification, function, and performance of the respective module 52' or 52". Because it includes a non-volatile memory, the CRUM 12 can act as a "scratch pad" for retaining the data stored therein, which travels with the replaceable modules 52' and 52", even when the modules 52' and 52" are not installed in the machine 110.

The operation of the machine 110 is generally controlled by a controller 120, which may include one or more microprocessors, application-specific integrated circuits (ASICs), or other signal processing devices encoded with instructions to operate the machine 110. When the modules 52' and 52" are installed in the machine 110, data is communicated between the CRUMs 12 and the controller 120 via a reader (coupler board) 122, which operates in a similar manner to the reader 14 described above. In addition, data may be communicated between a device 123 external to the machine 110 and one or both of the modules 52' and 52" and the controller 120. Controller 120 may also communicate with users through a user interface 124 or through a network connection 126, such as over phone lines or the Internet as indicated by the arrow 126 in FIG. 10.

For purposes of discussion herein, the machine 110 is depicted as a printing apparatus, such as a digital printer of the ink jet or "laser" (electrophotographic or xerographic) variety, or a digital or analog copier, and the modules 52' and 52" are depicted as including hardware devices related to printing (printing hardware), such as a marking material supply module and a marking device module, respectively. It is contemplated, however, that the machine 110 may be any electrical, electronic, mechanical, electromechanical device configured to perform one or more functions, and the modules 52' and 52" may be any component, group of components, system, or subsystem of the machine 10. The word "printer" as used herein encompasses any apparatus, such as a digital copier, bookmaking machine, facsimile machine, multi-function machine, etc. which performs a print outputting function for any purpose.

In the embodiment of FIG. 10, sheets on which images are to be printed are drawn from a stack 130 and move relative to the marking device module 52", where the individual sheets are printed upon with desired images. The marking material for placing marks on various sheets by marking device module 52" is provided by marking material supply module 52'. If machine 110 is an electrostatographic printer, marking material supply module 52' may include a supply of toner, while marking device module 52" may include any number of hardware items for the electrostatographic process, such as an image receptor (photoreceptor) or fusing device. In the well-known process of electrostatographic printing, the most common type of which is known as "xerography," a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finally divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate, such as paper from the stack 130, and the image affixed thereto to form a permanent record of the image.

In the ink-jet context, the marking material supply module 52' includes a quantity of liquid or solid ink, and may include separate tanks for different primary-colored inks, while marking device module 52" includes a printhead. In either the electrostatographic or ink-jet context, "marking material" can include other consumed items used in printing but not precisely used for marking, such as oil or cleaning fluid used in a fusing device. Of course, depending on a particular design of a machine 110, the functions of modules 52' and 52" may be combined in a single module, or alternatively, the marking device may not be provided in a easily replaceable module such as 52". Further, there may be provided several different marking material supply modules 52', such as in a full color printer. In general, it is contemplated that the machine may include one or more replaceable modules, and it is expected that, at multiple times within the life of machine 110, one or more of these modules need to be removed or replaced. In the current market for office equipment, for example, it is typically desirable that modules such as 52' and 52" be readily replaceable by the end user, thus saving the expense of having a representative of the vendor visit the user.

There are many different types of data that can be stored in CRUM 12. For example, U.S. Pat. No. 6,016,409 issued Jan. 18, 2000 and entitled "System For Managing User Modules in a Digital Printing Apparatus", which is incorporated by reference herein in its entirety, describes various data that may be stored in a CRUM and various functions that may be performed using this data. Advantageously, using the interface antenna 10 in the manner described with reference to FIGS. 3-9 allows this data to be read from, or written to the CRUM 12 from a distance further than would otherwise be possible without the interface antenna 10. With the embodiments of FIGS. 5-9 this data can be read from, or written to the CRUM 12 when the modules 52 are packaged for delivery or storage. Depending on the data stored in the CRUM 12, this could be used in many useful ways.

For example, the CRUM 12 could retain a serial number of the particular module. Using the interface antenna 10, identification of the module by the serial number can be determined by the reader 14 without having to remove the module from the package 70. Also, the serial number as read by the reader 14 can be used to verify authenticity of the module, thereby identifying any counterfeit modules packaged in authentic packages. The serial number as read by the reader 14 can also be useful for inventory tracking, batch identification, and the like.

In other types of CRUM systems, the CRUM 12 can further act as an "odometer" to maintain a cumulative count indicating use of the module. For example, where the module is to be used with a printing apparatus, the count may indicate the number of prints which have been output using the particular module. Using the interface antenna 10, this count may be read from a packaged module to determine whether the module is new or refurbished. Similarly, the CRUM 12 may store one or more threshold values (e.g., max number of prints, etc.) against which the count is compared to determine the health of the module. Using the interface antenna 10, these threshold values may be read from or written to the CRUM 12 using the reader 14 while the module remains packaged.

Another type of data which may be stored in a particular location in the non-volatile memory of the CRUM 12 may relate to specific performance data associated with the module, so that the module can be operated in an optimal, or at least advisable, manner. For instance, in the ink jet context, it is known to load data symbolic of optimal voltage or pulse width in the CRUM 12, so that the particular module may be optimally operated when the module is installed. In the xerographic context, it is known to load into a CRUM module specific data such as relating to the tested transfer efficiency of toner from a photoreceptor to a print sheet: this information is useful for an accurate calculation of toner consumption. Using the interface antenna 10, this performance data may be read from or written to the CRUM 12 using the reader 14 while the module remains packaged.

Other types of data which may be included in the non-volatile memory in CRUM 12 include one or more serial numbers of machines, such as printers, in which the particular module has been installed: this may be useful for tracing faults in the module or among a population of machines. Also, if the particular module is intended to be remanufactured, another useful piece of data to be loaded into the memory can be the date of the last remanufacture of the module, as well as a code relating to some detail of the remanufacture, which may be symbolic of, for instance, a location of the remanufacture, or the specific actions that were taken on the module in a remanufacturing process. Again, the interface antenna 10 allows this information to be read from or written to the CRUM 12 using the reader 14 while the module remains packaged.

In yet another example, other types of data which may be included in the non-volatile memory in the CRUM 12 are used by the controller 120 to configure machine 110 option attributes for enabling or disabling various optional features of the machine or module. These option attributes may be associated with a particular user of the machine (e.g., permissions provided to a person using the copier) or may be associated with the machine in general (e.g., speed and/or voltage settings associated with the country in which the machine is used, optional features available under a sales contract or lease associated with the machine, etc.). Examples of these optional features may include but are not limited to: device/machine speed; machine stand alone mode or network connected mode; scanning enabled; scan to email; scan to Internet Fax; network server Fax enabled; job based accounting; etc. Other data that may be stored in the CRUM may include software updates, settings updates, and the like that are used by the controller 120. The interface antenna 10 allows data communication between the CRUM 12 and the reader 14 while the module is in the package, thus allowing any of this data to be read from or written to the CRUM 12 without removing the module from the package 70. Advantageously, this allows generic modules to be manufactured and packaged, with the CRUMs 12 of these generic modules later being programmed for particular applications as they are needed.

It should be understood that any of the features, characteristics, alternatives or modifications described regarding a particular embodiment herein may also be applied, used, or incorporated with any other embodiment described herein.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An interface antenna for increasing a distance over which a tag can communicate with a reader, comprising:
   one or more loops of conductive material disposed on a substrate, the loops having a stray capacitance associated therewith,
   wherein,
      when the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader, and
      a number of the loops, a cross-section of the conductive material and a spacing between the loops are determined so that a total reactance, including said stray capacitance, of the interface antenna allows the interface antenna to have a resonant frequency approximating that of the tag antenna.

2. The interface antenna of claim 1, wherein the increase in intensity of the electromagnetic carrier signal is caused by oscillation of reactive elements of the interface antenna in response to the electromagnetic carrier signal received from the reader antenna.

3. The interface antenna of claim 1, further comprising a charge storage element electrically coupled to the interface antenna, wherein the total reactance of the interface antenna includes a capacitance of said charge storage element.

4. The interface antenna of claim 3, wherein the charge storage element comprises a surface-mounted device disposed on the substrate.

5. The interface antenna of claim 1, wherein the carrier signal is a radio frequency carrier signal, the tag is a radio frequency identification tag, and the reader is a radio frequency identification reader.

6. The interface antenna of claim 1, wherein the substrate includes at least one of: a portion of a package and a label for a package.

7. The interface antenna of claim 6, wherein the tag is secured to hardware for electrostatographic printing, and the hardware for electrostatographic printing is disposed in the package.

8. The interface antenna of claim 1, wherein the loops are formed from a conductive ink applied to the substrate.

9. The interface antenna of claim 1, wherein the tag is disposed within an object, and the substrate is secured to the object.

10. The interface antenna of claim 1, wherein the substrate is secured to the reader.

11. A package for an object, the object having a tag associated therewith for wirelessly communicating data with a reader external to the package, the package comprising:

an interface antenna for increasing a distance over which a tag can communicate with a reader, the interface antenna having one or more loops of conductive material disposed on a substrate, the loops having a stray capacitance associated therewith, wherein, when the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader, and a number of the loops, a cross-section of the conductive material and a spacing between the loops are determined so that a total reactance, including said stray capacitance, of the interface antenna allows the interface antenna to have a resonant frequency approximating that of the tag antenna.

12. The package of claim 11, wherein the carrier signal is a radio frequency carrier signal, the tag is a radio frequency identification tag, and the reader is a radio frequency identification reader.

13. The package of claim 11, wherein the interface antenna is attached to a label on the package.

14. The package of claim 13, wherein at least a portion of the interface antenna is formed from a conductive ink applied to the label.

15. The package of claim 11, wherein at least a portion of the interface antenna is formed from a conductive ink applied to the package.

16. The package of claim 11, wherein the object includes hardware for electrostatographic printing.

17. A label having an interface antenna attached thereto for increasing a distance over which a tag can communicate with a reader, the interface antenna having one or more loops of conductive material disposed on a substrate, the loops having a stray capacitance associated therewith, wherein, when the interface antenna is positioned between a tag antenna associated with the tag and a reader antenna associated with the reader, the interface antenna receives an electromagnetic carrier signal transmitted by the reader antenna and causes an increase in intensity of the electromagnetic carrier signal at the location of the tag antenna, thereby increasing the distance over which the tag can communicate with the reader, and a number of the loops, a cross-section of the conductive material and a spacing between the loops are determined so that a total reactance, including said stray capacitance, of the interface antenna allows the interface antenna to have a resonant frequency approximating that of the tag antenna.

18. The label of claim 17, wherein at least a portion of the interface antenna is formed from a conductive ink applied to the label.

19. A method for increasing a distance over which a tag can communicate with a reader, the method comprising:

forming an interface antenna having one or more loops of conductive material on a substrate, the loops having a stray capacitance associated therewith; and positioning the interface antenna between a tag antenna associated with the tag and a reader antenna associated with the reader, wherein the interface antenna receives an electromagnetic carrier signal transmitted by the reader antenna and causes an increase in intensity of the electromagnetic carrier signal at the location of the tag antenna, thereby increasing the distance over which the tag can communicate with the reader, and a number of the loops, a cross-section of the conductive material and a spacing between the loops are determined so that a total reactance, including said stray capacitance, of the interface antenna allows the interface antenna to have a resonant frequency approximating that of the tag antenna.

20. The method of claim 19, wherein the tag is secured to an object, and positioning the interface antenna includes: placing the object in a package including the interface antenna.

21. The method of claim 19, wherein the tag is secured to an object disposed within a package, and positioning the interface antenna includes: attaching a label including the interface antenna to the package.

22. The method of claim 19, wherein the tag is disposed within an object, and positioning the interface antenna includes attaching the interface antenna to the object.

23. A module installable in a machine, the module having:

a tag a associated therewith, the tag including a tag antenna coupled to an integrated circuit device having data related to the module stored therein, the tag being configured to superimpose the data from the integrated circuit device onto an electromagnetic carrier signal received by the tag antenna; and an interface antenna associated therewith, the interface antenna having one or more loops of conductive material disposed on a substrate, the loops having a stray capacitance associated therewith, the interface antenna being configured to increase an intensity of the electromagnetic carrier signal at the location of the tag antenna, wherein a number of the loops, a cross-section of the conductive material and a spacing between the loops are determined so that a total reactance, including said stray capacitance, of the interface antenna allows the interface antenna to have a resonant frequency approximating that of the tag antenna.

24. The module of claim 23, wherein the module includes printing hardware that renders the module suitable for use in a printing apparatus.

25. The module of claim 24, wherein the module is one of a marking material supply module and a marking device module.

26. The module of claim 25, wherein the marking material supply module includes at least one of: toner, liquid ink, solid ink, oil, and cleaning fluid.

27. The module of claim 25, wherein the marking device module includes at least one of: an image receptor, a fusing device, and a printhead.

28. The module of claim 23, wherein the increase in intensity of the electromagnetic carrier signal is caused by oscillation of reactive elements of the interface antenna in response to the electromagnetic carrier signal.

29. The module of claim 23, further comprising a charge storage element electrically coupled to the interface antenna, wherein the total reactance of the interface antenna includes a capacitance of said charge storage element.

30. The module of claim 23, wherein the interface antenna is attached to a package in which the module is disposed.

31. The module of claim 23, wherein the interface antenna is attached to the module.

* * * * *